United States Patent
Kinugasa et al.

(10) Patent No.: US 6,409,973 B1
(45) Date of Patent: Jun. 25, 2002

(54) EXHAUST GAS PURIFICATION DEVICE FOR AN ENGINE

(75) Inventors: Yukio Kinugasa; Toshifumi Takaoka; Kouhei Igarashi, all of Susono; Takaaki Itou, Mishima, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 08/523,455

(22) Filed: Sep. 5, 1995

(30) Foreign Application Priority Data

Sep. 16, 1994 (JP) ............................................. 6-221624

(51) Int. Cl.$^7$ ......................... B01D 53/14; B01D 53/34; F01N 3/10
(52) U.S. Cl. ...................... 422/171; 422/172; 422/177; 60/289; 60/297
(58) Field of Search ................................ 422/169–171, 422/172, 177; 60/297, 286, 289, 295

(56) References Cited

U.S. PATENT DOCUMENTS

| | | | | |
|---|---|---|---|---|
| 3,870,474 A | * | 3/1975 | Houston | 422/171 |
| 4,315,895 A | | 2/1982 | Bramer et al. | 422/171 |
| 5,235,956 A | | 8/1993 | Yoshizaki | 60/289 |
| 5,388,403 A | * | 2/1995 | Nagami | 60/289 |
| 5,388,406 A | | 2/1995 | Takeshima et al. | 60/297 |
| 5,417,927 A | * | 5/1995 | Houston | 422/171 |
| 5,433,074 A | | 7/1995 | Seto et al. | 60/301 |
| 5,457,958 A | * | 10/1995 | Boegner et al. | 60/297 |

FOREIGN PATENT DOCUMENTS

| | | |
|---|---|---|
| DE | 31 01 053 | 3/1983 |
| DE | 43 42 062 | 6/1994 |
| JP | 49-120016 | 11/1974 |
| JP | 62106826 A | 5/1987 |
| JP | 62117620 A | 5/1987 |
| JP | 6-173659 | 6/1994 |
| JP | 6210134 A | 8/1994 |

OTHER PUBLICATIONS

Patent Abstracts of Japan, vol. 10, No. 373, Dec. 12, 1986 & JP–A–61 164628 (Mitsui Mining) Jul. 25, 1986.

* cited by examiner

Primary Examiner—Hien Tran
(74) Attorney, Agent, or Firm—Kenyon & Kenyon (57) ABSTRACT

The exhaust gas purification device according to the present invention utilizes two $NO_x$ absorbents in order to remove $NO_x$ from the exhaust gas of an engine operated at a lean air-fuel ratio. The $NO_x$ absorbents are disposed, in series, in the exhaust passage of the engine and a nozzle for supplying a reducing agent is disposed in the exhaust passage at a position between the two $NO_x$ absorbents. Further, the device includes switching valves for changing the direction of the exhaust gas flow in the exhaust gas passage. When the switching valves are set to direct the exhaust gas flow to one direction, the exhaust gas first flows through one of the $NO_x$ absorbents (first $NO_x$ absorbent), and after passing through the first $NO_x$ absorbent, the reducing agent is supplied to the exhaust gas before it flows into the other $NO_x$ absorbent (second $NO_x$ absorbent). Thus, the first $NO_x$ absorbent absorbs $NO_x$ in the exhaust gas, and the $NO_x$ absorbed by the second NOabsorbent is released from the second $NO_x$ absorbent. When the switching valves are switched, the exhaust gas flows in the opposite direction, and flows through the second $NO_x$ absorbent and the first $NO_x$ absorbent in this order. In this case, the second $NO_x$ absorbent absorbs $NO_x$ in the exhaust gas, and the $NO_x$ absorbed by the first $NO_x$ absorbent is released and reduced to $N_2$. Therefore, by reversing the direction of the exhaust gas periodically, the absorbing operation of $NO_x$ and releasing/reducing operation of $NO_x$ are performed by two $NO_x$ absorbents alternately. Thus, it becomes possible to remove $NO_x$ in the exhaust gas continuously while the $NO_x$ absorbents are prevented from being saturated by the absorbed $NO_x$.

2 Claims, 5 Drawing Sheets

EXHAUST GAS PURIFICATION DEVICE FOR AN ENGINE

BACKGROUND OF THE INVENTION

1. Field of the Invention

The present invention relates to an exhaust gas purification device for an engine. More specifically, the present invention relates to a device that is capable of effectively removing an $NO_x$ component from exhaust gas.

2. Description of the Related Art

An exhaust gas purification device capable of removing an $NO_x$ component from engine exhaust gas is, for example, disclosed in the Japanese Unexamined Patent Publication (Kokai) No. 62-117620. The device disclosed in JPP '620 is used for removing $NO_x$ components from the exhaust gas of a lean burn engine, i.e., an engine operated at an air-fuel ratio higher than a stoichiometric air-fuel ratio. In the device disclosed in JPP '620, an exhaust passage of the engine is diverged into two branch exhaust passages, and a $NO_x$ absorbent is disposed in each of the branch exhaust passages, namely, two $NO_x$ absorbents are disposed in the exhaust gas passage in parallel. The $NO_x$ absorbent is capable of absorbing an $NO_x$ component in the exhaust gas in the presence of oxygen. Since the engine is operated on a lean air-fuel ratio, the exhaust gas from the engine contains relatively high concentration of oxygen, therefore, $NO_x$ components contained in the exhaust gas are absorbed by the $NO_x$ absorbents.

When the $NO_x$ absorbent absorbs a certain amount of $NO_x$, the ability of the $NO_x$ absorbent to absorb $NO_x$ in the exhaust gas is reduced. To regain the absorption ability, the absorbed $NO_x$ in the absorbent must be discharged and reduced periodically. For example, by supplying a reducing agent to the $NO_x$ absorbent, the $NO_x$ absorbents are regenerated to regain the initial $NO_x$ absorption ability. In the device in JPP '620, two $NO_x$ absorbents are disposed in parallel in the exhaust passage in order to enable regeneration of the $NO_x$ absorbent without stopping the purification of the exhaust gas. In JPP '620, two $NO_x$ absorbents are used alternately during normal engine operation, i.e., only one of the $NO_x$ absorbents is used for absorbing the $NO_x$ in the exhaust gas. Namely, in the normal operation, one of the branch exhaust passage is closed, and the exhaust gas from the engine is directed to the other branch exhaust passage where the $NO_x$ in the exhaust gas is absorbed by the $NO_x$ absorbent disposed in that exhaust branch passage. While absorbing $NO_x$ in the exhaust gas by one $NO_x$ absorbent, the other $NO_x$ absorbent disposed on the closed exhaust branch passage is regenerated by supplying a reducing agent, such as hydrogen gas.

According to the device disclosed in JPP '620, by using two $NO_x$ absorbents disposed in the exhaust passage in parallel, the $NO_x$ absorbents can be regenerated alternately while continuing to remove the $NO_x$ component from the exhaust gas.

However, a disadvantage of the device disclosed in JPP '620 has is that the reducing agent must be supplied to both exhaust branch passages. This requires two injection nozzles, one in each of the exhaust branch passages, and associated piping connecting the nozzles to the supply source of the reducing agent, and a three-way flow control valve for switching the supply of the reducing agent between the two nozzles. Further, elaborate control of the three-way flow control valve is required to enable the appropriate regeneration of the $NO_x$ absorbents.

SUMMARY OF THE INVENTION

In view of the problems in the prior art set forth above, the object of the present invention is to provide an exhaust gas purification device for an internal combustion engine which is capable of removing $NO_x$ components from the exhaust gas without requiring complicated devices and controls.

The above object is achieved by the present invention, an exhaust gas purification device, for an internal combustion engine. The engine is operated with an air-fuel ratio higher than a stoichiometric air-fuel ratio. The device comprises (a) first and second $NO_x$ absorbents disposed in the exhaust passage of the engine and connected in series by an exhaust connecting passage, each of the $NO_x$ absorbents absorbs $NO_x$ components in the exhaust gas when the air-fuel ratio of the exhaust gas flowing into the $NO_x$ absorbents is lean, and releases the absorbed $NO_x$ when the oxygen concentration in the exhaust gas becomes lower; (b) a reducing agent supply means for supplying a reducing agent to the exhaust gas in the exhaust connecting passage between the first and the second $NO_x$ absorbents; (c) a switching means for switching the direction of the exhaust gas flow between a first direction in which the exhaust gas flows through the first $NO_x$ absorbent, the exhaust connecting passage and the second $NO_x$ absorbent in this order, and a second direction in which the exhaust gas flows through the second $NO_x$ absorbent, the exhaust connecting passage and the first $NO_x$ absorbent in this order; (d) and a control means for controlling the switching means so that the direction of the exhaust gas flow is switched between the first and the second direction each time when a predetermined condition is satisfied.

When the flow direction of exhaust gas is switched to the first direction, the lean air-fuel ratio exhaust gas from the engine first flows into the first $NO_x$ absorbent and $NO_x$ components in the exhaust gas are absorbed by the first $NO_x$ absorbent. After passing through the first $NO_x$ absorbent, a reducing agent is supplied to the exhaust gas in the exhaust connecting passage before flowing into the second $NO_x$ absorbent. Therefore, the air-fuel ratio of the exhaust gas flowing into the second $NO_x$ absorbent becomes rich due to the reducing agent. Thus, in the second $NO_x$ absorbent, the absorbed $NO_x$ is released and reduced to nitrogen by the reducing agent. Namely, when the exhaust gas flow is switched to the first direction, $NO_x$ components in the exhaust gas are absorbed by the first $NO_x$ absorbent and removed from the exhaust gas, and the $NO_x$ in the second $NO_x$ absorbent is released and reduced to nitrogen.

On the other hand, when the exhaust gas flow is switched to the second direction, the lean exhaust gas from the engine first flows into the second $NO_x$ absorbent and $NO_x$ components in the exhaust gas are absorbed by the second $NO_x$ absorbent. Then, the reducing agent is supplied to the exhaust gas in the exhaust connecting passage before flowing into the first $NO_x$ absorbent. Therefore, the rich exhaust gas flows into the first $NO_x$ absorbent, and absorbed $NO_x$ is released from the first $NO_x$ absorbent and reduced to nitrogen by the reducing agent. Therefore, by switching the direction of the exhaust gas flow each time when the predetermined condition is satisfied, for example, each time an amount of $NO_x$ absorbed in the $NO_x$ absorbent reaches a predetermined value, absorption of $NO_x$ in the exhaust gas and releasing and reducing of the absorbed $NO_x$ is performed in each $NO_x$ absorbent alternatively without stopping the absorption of $NO_x$ in the exhaust gas as a whole.

According to another aspect of the present invention, there is provided an exhaust gas purification device for an internal combustion engine having an exhaust passage. The engine is operated at an air-fuel ratio equal to, or lower than, a stoichiometric air-fuel ratio. The device comprises (a), first and second $NO_x$ absorbents disposed in the exhaust passage of the engine and connected each other in series by an exhaust connecting passage, each of the $NO_x$ absorbents absorbs $NO_x$ components in the exhaust gas when the air-fuel ratio of the exhaust gas flowing into the $NO_x$ absorbents is lean, and releases the absorbed $NO_x$ when the oxygen concentration in the exhaust gas becomes; (b) a secondary air supply means for supplying secondary air to the exhaust gas in the exhaust connecting passage between the first and the second $NO_x$ absorbents; (c) a switching means for switching the direction of the exhaust gas flow between a first direction in which the exhaust gas flows through the first $NO_x$ absorbents, the exhaust connecting passage and the second $NO_x$ absorbent in this order, and a second direction in which the exhaust gas flows through the second $NO_x$ absorbent, the exhaust connecting passage and the first $NO_x$ absorbent in this order; and (d) a control means for controlling the switching means so that the direction of the exhaust gas flow is switched between the first and the second direction each time when a predetermined condition is satisfied.

In this aspect of the invention, the air-fuel ratio of the exhaust gas from the engine is rich, i.e., lower than, or equal to, the stoichiometric air-fuel ratio, and relatively low concentrations of oxygen and a relatively high concentrations of HC and CO components are contained in the exhaust gas. Therefore, when the direction of exhaust gas flow is switched to the first direction, the exhaust gas with a rich air-fuel ratio flows into the first $NO_x$ absorbent, and the absorbed $NO_x$ is released from the first $NO_x$ absorbent and reduced to nitrogen by HC and CO components in the exhaust gas. After passing through the first $NO_x$ absorbent, the secondary air is supplied to the exhaust gas in the exhaust connecting passage before it flows into the second $NO_x$ absorbent, and the air-fuel ratio of the exhaust gas flowing into the second $NO_x$ absorbent becomes lean. Therefore, a small amount of $NO_x$ which passes through the first $NO_x$ absorbent is absorbed by the second $NO_x$ absorbent and removed completely from the exhaust gas.

Namely, when the direction of the exhaust gas flow is switched to the first direction, the absorbed $NO_x$ is released from the first $NO_x$ absorbent and reduced to nitrogen, and at the same time, $NO_x$ in the exhaust gas is absorbed by the second $NO_x$ absorbent.

Similarly, when the direction of the exhaust gas flow is switched to the second direction, the absorbed $NO_x$ is released from the second $NO_x$ absorbent and reduced to nitrogen, and $NO_x$ in the exhaust gas is absorbed by the first $NO_x$ absorbent at the same time.

Therefore, in this aspect of the present invention, by switching the direction of the exhaust gas flow each time when the predetermined condition is satisfied, absorption of $NO_x$ in the exhaust gas and releasing and reducing of the absorbed $NO_x$ is performed in each $NO_x$ absorbent alternatively, without stopping absorption of $NO_x$ in the exhaust gas as a whole.

BRIEF DESCRIPTION OF THE DRAWINGS

The present invention will be better understood from the description as set forth hereinafter, with reference to the accompanying drawings, in which.

DESCRIPTION OF PREFERRED EMBODIMENTS

Figure 1:
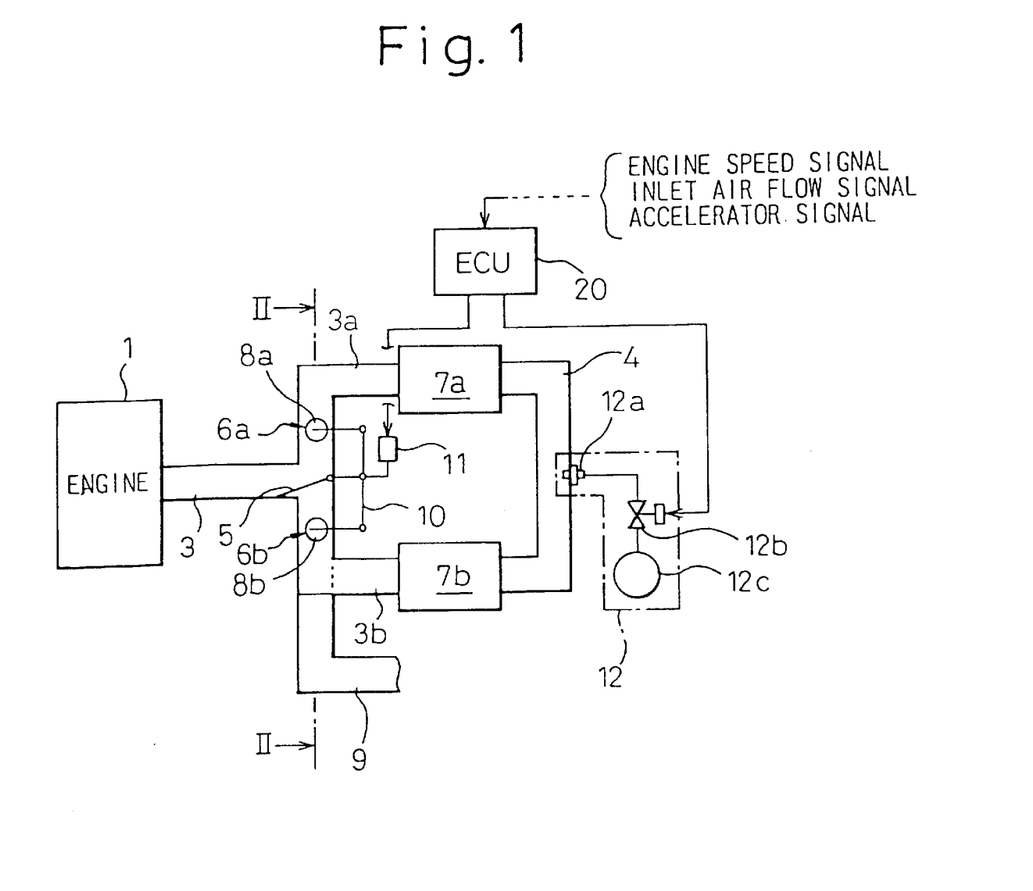
FIG. 1 is a drawing schematically illustrating an embodiment of the exhaust gas purification device according to the present invention when applied to an automobile engine.

FIG. 1 schematically illustrates an embodiment of an exhaust gas purification device, according to the present invention, as applied to an automobile engine.

In FIG. 1, reference numeral 1 designates an internal combustion engine such as a diesel engine or a lean-burn gasoline engine. The engine 1 is operated at an air-fuel ratio higher than the stoichiometric air-fuel ratio some paint in time during the normal operating range. Numeral 3 designates an exhaust gas passage of the engine 1. The exhaust gas passage 3 diverges into two branch exhaust passages 3a and 3b, and a $NO_x$ absorbent (designated by 7a and 7b) is connected to each branch exhaust passage. The $NO_x$ absorbents 7a and 7b are connected to each other at opposite ends of to the exhaust branch passage 3a and 3b by an exhaust connecting passage 4.

A switching valve 5 is disposed on the exhaust gas passage 3 at the point where the branch exhaust passages 3a and 3b diverge. The switching valve 5 is actuated by a control signal from an engine control circuit (ECU) 20 which is explained later. The switching valve 5 directs the exhaust gas flow to either of the branch exhaust passages 3a and 3b by closing the inlet of one of the branch exhaust passages 3a and 3b. On the respective branch exhaust passages 3a and 3b, a port 6a, 6b and a shut-off valve 8a, 8b, which closes the port 6a, 6b, respectively, are disposed at the portion between the switching valve 5 and the $NO_x$ absorbents 7a and 7b.

Figure 2:
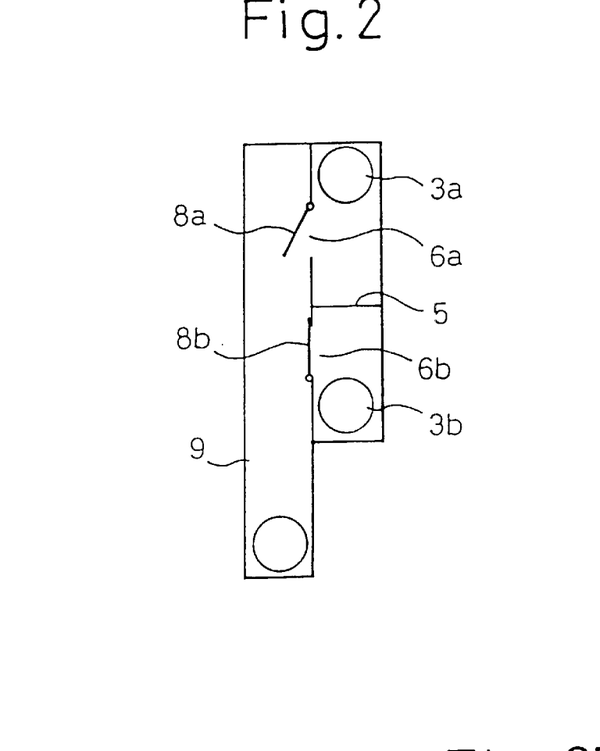
FIG. 2 is a sectional view of the exhaust passage in FIG. 1 taken along a line II—II in FIG. 1.

FIG. 2 schematically illustrates the section of the branch exhaust passages 3a and 3b taken along the line II—II in FIG. 1. As shown in FIG. 2, an exhaust outlet passage 9 is attached to the branch exhaust passages 3a and 3b. The exhaust outlet passage 9 communicates the branch exhaust passages 3a and 3b through the ports 6a and 6b, respectively. Namely, when the shut-off valve 8a is opened, the branch exhaust passage 3a is connected to the exhaust outlet passage 9 via the port 6a, and when the shut-off valve 8b is opened, the branch exhaust passage 3b is connected to the exhaust outlet passage 9 via the port 6b. The exhaust outlet passage 9 opens to the atmosphere downstream of a muffler (not shown) disposed therein.

In this embodiment, the switching valve 5 and the shut-off valves 8a and 8b are functionally connected to each other by a mechanical link 10 and driven by a common actuator 11. The actuator 11 may be a solenoid actuator, a vacuum actuator, or any other appropriate type of actuator that can drive the switching valve 5 and shut-off valves 8a and 8b synchronously in accordance with the control signal from the ECU 20. In this embodiment, the shut-off valves 8a and 8b are operated through the mechanical link 10 in such a manner that the shut-off valve 8b opens the port 6b and the shut-off valve 8a closes the port 6a when the switching valve 5 is at a position closing the inlet of the branch exhaust passage 3b (i.e., the position shown in FIG. 1), and in such a manner that the shut-off valve 8a opens the port 6a and the shut-off valve 8b closes the port 6b when the switching valve 5 is at a position closing the inlet of the branch exhaust passage 3a.

Therefore, when the switching valve 5 is set at the position closing the inlet of the branch exhaust passage 3b, the exhaust gas from the engine flows into the branch exhaust passage 3a and flows through the $NO_x$ absorbent 7a, the exhaust connecting passage 4 and the $NO_x$ absorbent 7b in this order, and, after leaving the $NO_x$ absorbent 7b, flows into the exhaust outlet passage 9 through the port 6b. This direction of the exhaust gas flow is called a first direction hereinafter.

On the other hand, when the switching valve 5 is set at the position closing the inlet of the branch exhaust passage 3a, the exhaust gas from the engine flows into the branch exhaust passage 3b and flows through the $NO_x$ absorbent 7b, the exhaust connecting passage 4 and the $NO_x$ absorbent 7a in this order, and, after leaving the $NO_x$ absorbent 7a, flows into the exhaust outlet passage 9 through the port 6a. This direction of the exhaust gas flow is called a second direction hereinafter. It will be understood from the above description, that the direction of the exhaust gas flow in the $NO_x$ absorbents 7a, 7b and the exhaust connecting passage 4 is reversed by switching the position of the switching valve 5.

In FIG. 1, numeral 12 designates a reducing agent supply unit which supplies a reducing agent to the exhaust connecting passage 4. The reducing agent supply unit 12 includes a supply source 12c of a pressurized reducing agent, such as a pressurized container of the reducing agent or a reducing agent supply pump, and a nozzle 12a for injecting the reducing agent into the exhaust connecting passage 4. The reducing agent supply unit is provided with a flow control valve 12b which controls the injection rate of the reducing agent in accordance with a control signal from the ECU 20.

In this embodiment, substances which generate components such as hydrogen $H_2$, hydrocarbon HC, and carbon monoxide CO can be used as the reducing agent. Therefore, reducing gases such as hydrogen gas or carbon monoxide gas, gaseous or liquid hydrocarbons such as propane, propylene or butane, and liquid fuels such as gasoline, gas oil or kerosene, etc., can be used as the reducing agent in the present invention.

The engine control unit 20 in FIG. 1 comprises, for example, a digital computer including a ROM (read only memory), a RAM (random access memory), a CPU (central processing unit), and I/O (input and output) interface, all connected each other by a bi-directional bus. The ECU 20 performs the basic control of the engine 1 such as fuel injection control. In addition, the ECU 20 controls the absorption and releasing operation of $NO_x$ absorbents 7a and 7b as explained later in detail. For this purpose, signals representing engine operating conditions, such as an engine speed signal, an accelerator signal which represents depression of the accelerator pedal, and an inlet air flow amount signal, are fed to the I/O interface from the respective sensors (not shown). Further, the I/O interface of the ECU 20 is connected to the actuator 11 of the link 10 and the flow control valve 12b of the reducing agent supply unit 12 in order to supply the control signals.

The $NO_x$ absorbents 7a and 7b use alumina as a carrier, and on this carrier, precious metals such as platinum, and at least one substance selected from alkali metals such as potassium K, sodium Na, lithium Li and cesium Cs; alkali-earth metals such as barium Ba and calcium Ca; and rare-earth metals such as lanthanum La and yttrium Y are carried. The $NO_x$ absorbents 7a and 7b absorb $NO_x$ in the exhaust gas when the air-fuel ratio of the exhaust gas flowing through the $NO_x$ absorbents is lean, and release the absorbed $NO_x$ when the oxygen concentration in the exhaust gas becomes low. In this specification, the term "air-fuel ratio of the exhaust gas" means a ratio of the air and the fuel (or reducing agent and other hydrocarbons) which are supplied to the engine or exhaust passages upstream of the $NO_x$ absorbents. Therefore, when no air and fuel (or reducing agent) is supplied in the exhaust passage upstream of the $NO_x$ absorbents 7a and 7b, the air-fuel ratio of the exhaust gas becomes the same as the operating air-fuel ratio of the engine (i.e., the air-fuel ratio of the air-fuel mixture supplied to combustion chambers of the engine).

Figure 3A:
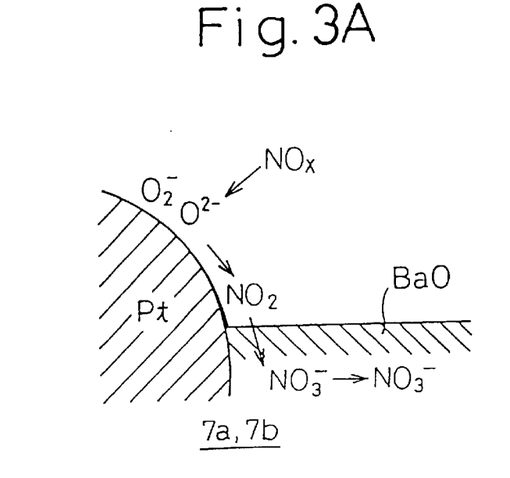
FIGS. 3A and 3B are views for explaining the absorbing and releasing operation of $NO_x$ by the $NO_x$ absorbent.
Figure 3B:
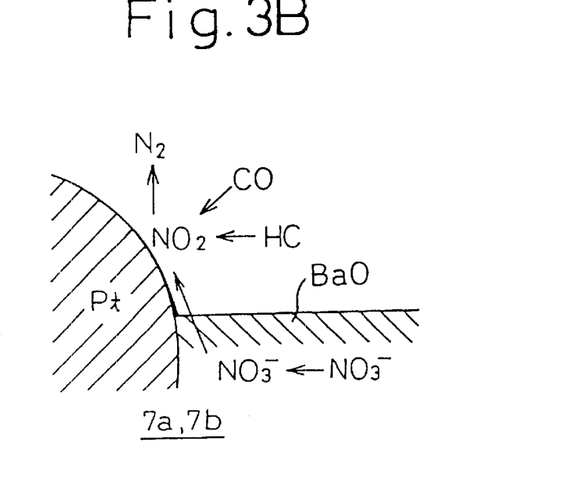

Though the mechanism of this absorption and releasing operation of the $NO_x$ absorbent is not clear, it is thought that the absorption and releasing operation is conducted by the mechanism shown in FIGS. 3A and 3B. FIGS. 3A and 3B explain the mechanism of the absorption and the releasing operation in the case where platinum Pt and barium Ba are carried on the carrier, as an example, but it is thought that a similar mechanism also applies even if other precious metals, alkali metals, alkali earth metals, or rare earth metals are used.

Namely, when the air-fuel ratio of the exhaust gas flowing into the $NO_x$ absorbent is lean, the concentration of oxygen in the exhaust gas is relatively high. In this case, as shown in FIG. 3A, the oxygen $O_2$ is deposited on the surface of platinum Pt in the form of $O_2^-$ or $O^{2-}$. The NO in the exhaust gas reacts with $O_2^-$ or $O^{2-}$ on the surface of the platinum Pt and becomes $NO_2$ ($2NO+O_2 \rightarrow 2NO_2$). Then, a part of the produced $NO_2$ is oxidized on the platinum Pt and absorbed into the $NO_x$ absorbent. While bonding with the barium oxide BaO, it is diffused in the absorbent in the form of nitric acid ions $NO_3^-$ as shown in FIG. 3A. In this way, $NO_x$ is absorbed in the $NO_x$ absorbent. As long as the oxygen concentration in the exhaust gas is high, the $NO_x$ is produced on the surface of the platinum Pt, and as long as the $NO_x$ is produced on the surface of the platinum Pt, and as long as the $NO_x$ absorption capacity of the absorbent is not saturated by the absorbed $NO_x$, the $NO_x$ is absorbed into the $NO_x$ absorbent and nitric acid ions $NO_3^-$ are produced.

On the other hand, when the oxygen concentration in the exhaust gas flowing into the $NO_x$ absorbent is lowered, the production of $NO_2$ is lowered and the reaction proceeds in an inverse direction ($NO_3^- \rightarrow NO_2$), and thus nitric acid ions $NO_3^-$ in the absorbent are released in the form of $NO_2$ from the $NO_x$ absorbent.

In this case, if components such as HC, CO exist in the exhaust gas, these components react with the oxygen $O_2$ in the exhaust gas and oxygen $O_2^-$ or $O^{2-}$ on the platinum Pt and are oxidized. By this oxidation of the HC, CO components, the oxygen component existing near the $NO_x$ absorbent is consumed, and the concentration of oxygen in the atmosphere around the $NO_x$ absorbent is lowered. Also, the $NO_2$ released from the $NO_x$ absorbent reacts with the HC and CO components in the exhaust gas as shown in FIG. 3B and is reduced to $N_2$. In this way, when the $NO_2$ on the surface of the platinum Pt reacts with HC and CO in the exhaust gas, and when the $NO_2$ no longer exist on the surface of the platinum Pt, the $NO_2$ is successively released from the absorbent.

Accordingly, if components such as HC, CO exist in the exhaust gas, the $NO_x$ is released from $NO_x$ absorbent and reduced to $N_2$ in a short time.

Namely, the HC and CO components in the reducing agent supplied to $NO_x$ absorbent immediately react with the $O_2^-$ or $O^{2-}$ on the platinum Pt and are oxidized, and subsequently if the HC and CO still remain after the $O_2^-$ or $O^{2-}$ on the platinum Pt are consumed, the $NO_x$ released from the absorbent is reduced to $N_2$.

In the embodiment in FIG. 1, the absorbing and releasing operations of the respective $NO_x$ absorbents 7a and 7b are controlled by switching the direction of the exhaust gas flow between the first and the second direction using the switching valve 5 as explained above.

Next, the operation of the exhaust gas purification device in FIG. 1 is explained. First, the case in which the switching valve 5 is set at the position closing the branch exhaust passage 3b (i.e., the position shown in FIG. 1) is explained. In this case, the exhaust gas flows in the first direction as explained before and flows into the $NO_x$ absorbent 7a first, and then flows into $NO_x$ absorbent 7b after passing through the $NO_x$ absorbent 7a. In this case, the reducing agent injected into the exhaust connecting passage 4 from the nozzle 12a of the reducing agent supply unit 12 flows into the $NO_x$ absorbent 7a.

Since the engine 1 in the present embodiment is operated at a lean air-fuel ratio, the air-fuel ratio of the exhaust gas from the engine 1 is substantially lean. Therefore, the exhaust gas flowing into the $NO_x$ absorbent 7a contains a relatively high concentration of oxygen, and the $NO_x$ in the exhaust gas is absorbed by the $NO_x$ absorbent, 7a as explained in FIG. 3A, and thus removed from the exhaust gas. Thus, an exhaust gas having very low concentration of $NO_x$ component is discharged from the $NO_x$ absorbent 7a and flows into the exhaust connecting passage 4. In the exhaust connecting passage 4, the reducing agent is supplied to the exhaust gas by the nozzle 12a of the reducing agent supply unit 12, and a mixture of the exhaust gas and the reducing agent flows into the $NO_x$ absorbent 7b. As explained later, the injection rate of the reducing agent is determined in such a manner that the air-fuel ratio of the mixture of the exhaust gas and the reducing agent flowing into the $NO_x$ absorbent 7b becomes lower than, or at least equal to, the stoichiometric air-fuel ratio. Therefore, the oxygen in the exhaust gas reacts with HC and CO components generated by the reducing agent in the $NO_x$ absorbent 7b, and the oxygen concentration in the exhaust gas in the $NO_x$ absorbent 7b becomes lower. Thus, the $NO_x$ absorbed in the $NO_x$ absorbent 7b is released from the absorbent and reduced by the HC and CO components in the exhaust gas as explained in FIG. 3B. Further, the $NO_x$ components, in the exhaust gas, which has passed the $NO_x$ absorbent, though very little, are also reduced to $N_2$ in the $NO_x$ absorbent 7b. Therefore, the exhaust gas, which has passed through the $NO_x$ absorbent 7b and which is discharged to atmosphere through the port 6a and the exhaust outlet passage 9, is almost completely free from $NO_x$ components.

When the switching valve 5 is switched to the position in which the inlet of the branch exhaust passage 3a is closed, the exhaust gas flows in the second direction, and flows into the $NO_x$ absorbent 7b first. In this case, contrary to the above, absorption of the $NO_x$ in the exhaust gas is performed in the $NO_x$ absorbent 7b, and the releasing and reducing of the absorbed $NO_x$ is performed on the $NO_x$ absorbent 7a.

From the above explanation, it will be understood that, if the switching valve 5 is operated so that it switches the direction of the exhaust gas flow at the appropriate time, the $NO_x$ absorbents 7a and 7b can absorb and release $NO_x$ alternately without stopping the exhaust gas flow. Thus, it becomes possible to remove $NO_x$ components in the exhaust gas continuously while preventing the $NO_x$ absorbents 7a and 7b from being saturated by the absorbed $NO_x$.

In this embodiment, the ECU 20 estimates the air-fuel ratio of the exhaust gas at the engine outlet based on the amount of the inlet air flow and the amount of the fuel injection. Then, the ECU 20 calculates the amount of the reducing agent required to adjust the air-fuel ratio of the exhaust gas to a value lower than the stoichiometric air-fuel ratio, and controls the flow control valve so that the calculated amount of the reducing agent is injected into the exhaust connecting passage 4. The required amount of the reducing agent varies in accordance with types of $NO_x$ absorbent, an amount of $NO_x$ absorbed in the $NO_x$ absorbent and the discharge rate of $NO_x$ (i.e., the temperature of the $NO_x$ absorbent). Therefore, it is preferable to determine the amount of the injection of the reducing agent by, for example, experimenting with the actual $NO_x$ absorbent used for the engine.

Though the switching valve may be switched at regular intervals, it is preferable to switch the valve 5 each time when the amount of absorbed $NO_x$ in the $NO_x$ absorbent reaches a predetermined value (for example, about 60% of the maximum absorbing capacity of the $NO_x$ absorbent) so that the releasing and reducing operation of $NO_x$ absorbent is performed before the $NO_x$ absorbent is saturated with absorbed $NO_x$.

In this case, for example, the amount of $NO_x$ generated by the engine 1 is measured beforehand in the respective engine load conditions, and stored in the ROM in the ECU 20 as a function of the parameter representing the engine load conditions (such as, the amount of inlet air flow and engine speed, or the accelerator signal and the engine speed). The ECU 20 calculates the amount of the $NO_x$ generated by the engine at regular intervals based on the engine load conditions. The amount of $NO_x$ absorbed by the $NO_x$ absorbent during the intervals is estimated as a value obtained by multiplying the amount of the generated $NO_x$ by a predetermined constant. The total amount of $NO_x$ absorbed by the $NO_x$ absorbent is obtained by accumulating the value obtained by the above calculation. The ECU 20 performs the estimation of the amount of $NO_x$ absorbed by the $NO_x$ absorbent during each interval and calculates the accumulated value thereof at regular intervals, and when the accumulated value reaches a predetermined value, the ECU 20 switches the switching valve 5.

Usually, the time required for the $NO_x$ absorbent to release and reduce the absorbed $NO_x$ is substantially shorter than the time required for the amount of absorbed $NO_x$ to reach the predetermined value. For example, usually it takes a few minutes to more than one hour for the absorbed $NO_x$ to reach the predetermined value while the releasing and reducing operation of $NO_x$ requires only less than one second to ten seconds. In actual operation of the engine 1, the reducing agent is injected only for a short time after the switching valve 5 is switched. Therefore, the amount of consumption of the reducing agent is relatively small in actual operation. Thus, even if the fuel of the engine 1 is used as the reducing agent, the fuel consumption of the engine does not increase significantly. When the releasing and reducing operation of $NO_x$ absorbent is completed, the supply of the reducing agent is stopped. This causes the air-fuel ratio of the exhaust gas flowing into the downstream side $NO_x$ absorbent to return to lean air-fuel ratio and the downstream $NO_x$ absorbent becomes available for absorbing $NO_x$ in the exhaust gas. Therefore, after the releasing and reducing operation is completed, even very small amount of $NO_x$ which is not absorbed by the upstream $NO_x$ absorbent can be absorbed by the downstream $NO_x$ absorbent, and the $NO_x$ components in the exhaust gas are almost completely removed even after the supply of the reducing agent is stopped.

Further, the reducing agent is supplied only to the exhaust connecting passage 4 in this embodiment and it is not required to supply the reducing agent to the respective branch exhaust passages 3a and 3b, i.e., it is not required to dispose the reducing agent injection nozzle and flow control valve on the respective branch exhaust passages 3a and 3b. Therefore, the construction of the reducing agent supply unit and the control thereof can be simplified.

Figure 4:
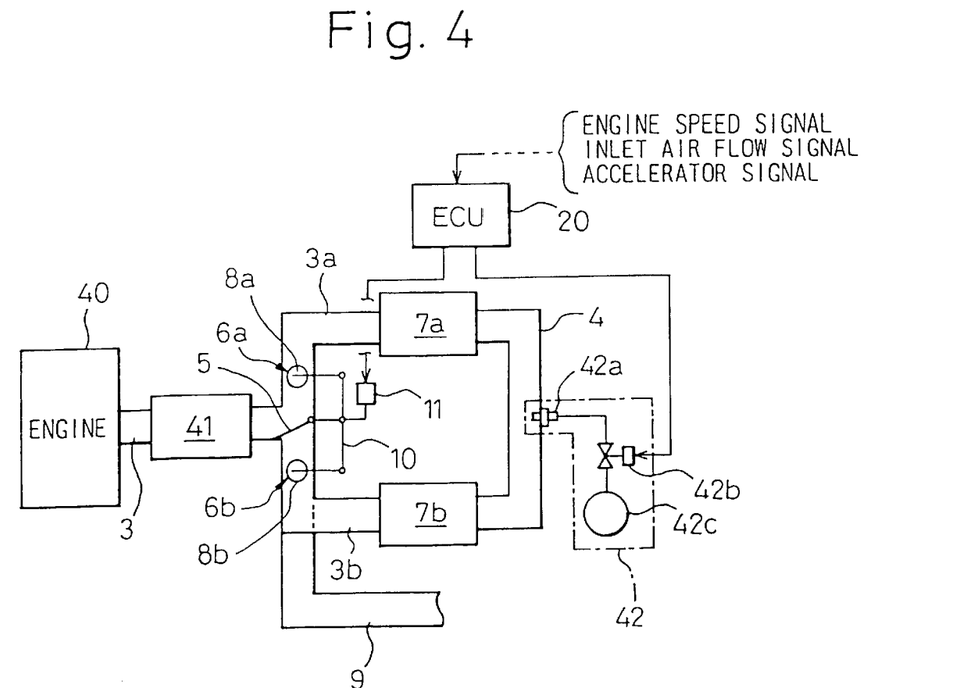
FIG. 4 is a drawing schematically illustrating another embodiment of the exhaust gas purification device according to the present invention.

Next, another embodiment of the present invention is explained with reference to Pig. 4. In FIG. 4, the same reference numerals as those in FIG. 1 represent the same elements as in FIG. 1, and a detailed explanation of these elements is omitted in order to avoid repetition.

In FIG. 4, reference numeral 40 designates an internal combustion engine. However, contrary to the previous embodiment, the engine 40 is operated at a rich air-fuel ratio, i.e., the air-fuel ratio is lower than, or equal to, the stoichiometric air-fuel ratio at least in a normal operating range in this embodiment. For example, the engine 40 in FIG. 4 is operated at a slightly rich air-fuel ratio, corresponding stoichiometry, of 0.98 to 0.99 in order to prevent an increase in fuel consumption. Further, a three-way reducing and oxidizing catalyst 41 of a known type is disposed on the exhaust gas passage 3 upstream of the branch exhaust passages 3a and 3b. The three-way reducing and oxidizing catalyst 41 is capable of removing HC, CO and $NO_x$ components in the exhaust gas simultaneously when the air-fuel ratio of the exhaust gas is close to a stoichiometric air-fuel ratio.

In FIG. 4, instead of the reducing agent supply unit 12, a secondary air supply unit 42 is provided. The secondary air supply unit 42 comprises a pressurized air source (such as an air pump) 42c, an air injection nozzle 42a for supplying secondary air to the exhaust gas in the exhaust connecting passage 4 and a flow control valve 42b for controlling the injection flow rate of the secondary air.

When an internal combustion engine is operated at an air-fuel ratio lower than the stoichiometric air-fuel ratio, the oxygen concentration in the exhaust gas falls rapidly and the concentrations of HC and CO rises rapidly. Since the engine 40 is operated at a slightly rich air-fuel ratio in the normal operating range, the exhaust gas from the engine 40 contains HC and CO at relatively high concentrations and oxygen at a low concentration. Further, when an internal combustion engine is operated at an air-fuel ratio near the stoichiometric air-fuel ratio, the amount of $NO_x$ generated by the engine increases. Therefore, the exhaust gas in this embodiment includes a larger amount of $NO_x$ than the exhaust gas in the embodiment in FIG. 1. As stated before, the three-way reducing and oxidizing catalyst is capable of removing HC, CO and $NO_x$ components at high efficiency when the air-fuel ratio of exhaust gas is close to the stoichiometric air-fuel ratio. However, when the air-fuel ratio of the exhaust gas is lower than the stoichiometric air-fuel ratio, the capability of the three-way catalyst for removing $NO_x$ components increases while the capability for removing HC and CO components decreases.

Therefore, when the exhaust gas from the engine passes through the three-way catalyst 41, a large part of $NO_x$ and portions of HC and CO are removed from the exhaust gas by the three-way catalyst 41. Thus, the exhaust gas flowing into the branch exhaust passages 3a and 3b contains a certain amount of HC and CO components and a small amount of $NO_x$ and oxygen components.

For example, when the switching valve 5 is set at the position which closes the inlet of branch exhaust passage 3b, the exhaust gas flows in the first direction as explained before, i.e., the exhaust gas passing through the three-way catalyst 41 is directed to the branch exhaust passage 3a and flows into the $NO_x$ absorbent 7a. Since the concentration of oxygen of this exhaust gas is low, and HC and CO are contained in this exhaust gas, the releasing and reducing of the absorbed $NO_x$ as explained by FIG. 3B occurs in the $NO_x$ absorbent 7a. Thus, the $NO_x$ absorbed by the $NO_x$ absorbent 7a and the $NO_x$ in the exhaust gas, which is not removed by the three-way catalyst 41 are reduced by the $NO_x$ absorbent 7a. Through the three-way catalyst 41, a portion of $NO_x$ is converted to $NH_3$ when the air-fuel ratio of the exhaust gas is lower than the stoichiometric air-fuel ratio, and this $NH_3$ is also consumed to reduce the $NO_x$ released from the $NO_x$ absorbent 7a.

After the exhaust gas passes through the $NO_x$ absorbent 7a, secondary air is supplied at the exhaust connecting passage 4 from the secondary air supply unit 42. The amount of the secondary air supplied to the exhaust gas is determined so that the air-fuel ratio of the exhaust gas flowing into the $NO_x$ absorbent 7b becomes higher than the stoichiometric air-fuel ratio. The ECU 20 calculates the air-fuel ratio of the engine 10 from the inlet air flow amount and the fuel injection amount. Further, the ECU 20 calculates the amount of the secondary air injection rate required to maintain the air-fuel ratio higher than the stoichiometric air-fuel ratio at the inlet of the $NO_x$ absorbent 7b, and controls the flow control valve 42b so that the calculated amount of secondary air is injected from the nozzle 42a.

Thus, the exhaust gas having lean air-fuel ratio flows into the $NO_x$ absorbent 7b, and the absorbing of $NO_x$ is performed in the $NO_x$ absorbent 7b. Therefore, the $NO_x$ component which was not removed by the three-way catalyst 41 and the $NO_x$ absorbent 7a is absorbed by the $NO_x$ absorbent 7b and removed from the exhaust gas. Further, HC and CO components in the exhaust gas which is not consumed by the $NO_x$ absorbent 7a during the releasing and reducing operation are also oxidized by the $NO_x$ absorbent 7b. Therefore, the exhaust gas after passing through the $NO_x$ absorbent 7b, which is discharged to atmosphere through the port 6a and the exhaust outlet passage 9, is almost completely free from HC, CO and $NO_x$ components.

When the switching valve 5 is switched to the position that closes the inlet of the branch exhaust passage 3a, the exhaust gas flows in the second direction. In this case, the exhaust gas after it passes through the three-way catalyst 41 flows into the $NO_x$ absorbent 7b first, and the releasing and reducing of $NO_x$ is performed in the $NO_x$ absorbent 7b and the absorbing of $NO_x$ is performed in the $NO_x$ absorbent 7a. Therefore, by switching the switching valve 5 at an appropriate intervals, the $NO_x$, absorbents 7a and 7b also perform the releasing and reducing operations and the absorbing operations alternately in this embodiment, and it becomes possible to remove $NO_x$ components in the exhaust gas continuously while preventing the $NO_x$ absorbents from being saturated by the absorbed $NO_x$. Also, in this embodiment, the interval of the switching operation of the switching valve 5 may be constant, or the switching valve may be switched each time when the amount of the absorbed $NO_x$ reaches a predetermined value, as explained in the previous embodiment. In this embodiment, however, it is different from the embodiment in FIG. 1 in that the secondary air is supplied to the exhaust connecting passage 4 continuously during the engine operation since the air-fuel ratio of the exhaust gas flowing into the downstream side $NO_x$ absorbent must be maintained at a lean air-fuel ratio.

Further, though the three-way catalyst 41 is provided for removing a large portion of the $NO_x$ generated by the engine 40, the three-way catalyst 41 may be omitted if the $NO_x$ absorbents 7a and 7b have sufficient capacities for absorbing the $NO_x$ components generated by the engine 40.

According to the present embodiment, the secondary air is supplied only to the exhaust connecting passage 4, therefore, the construction and control of the secondary air supply unit 42 is largely simplified.

Next, another embodiment of the present invention is described with reference to FIGS. 5A and 5B. In the previous embodiments, branch exhaust passages 3a and 3b are required to accommodate the $NO_x$ absorbents 7a and 7b. This arrangement is disadvantageous since it requires larger space for installation. This is true especially when the device is applied to automobile engines which have limited space for installation. In this embodiment, this problem is solved by containing the two branch exhaust passages and the two $NO_x$ absorbents in a single housing.

Figure 5A:
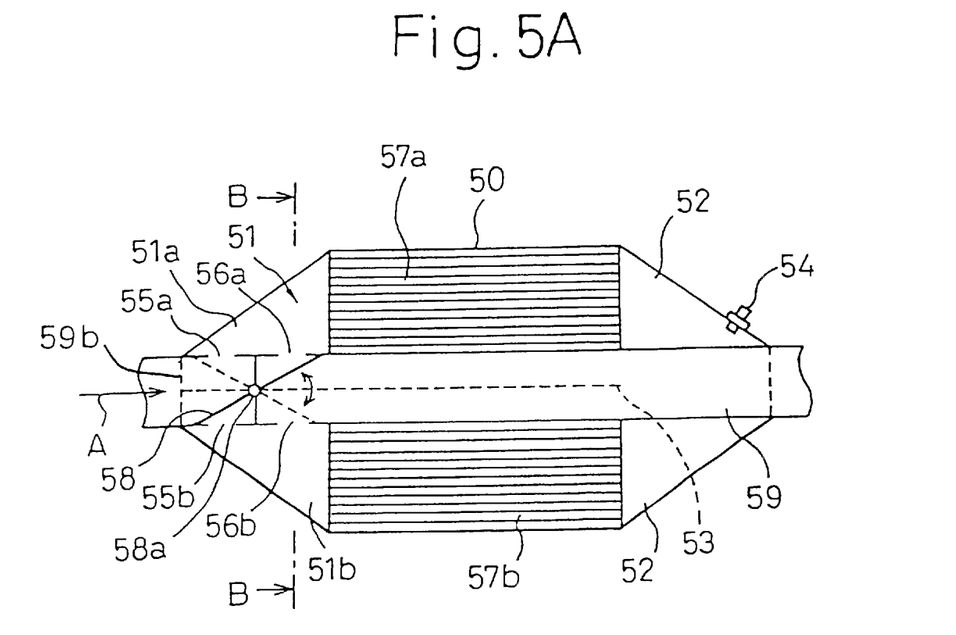
FIGS. 5A and 5B are drawings illustrating another embodiment of the exhaust gas purification device according to the present invention.

FIG. 5A shows a sectional view of a main part of the exhaust gas purification device according to the present embodiment.

In FIG. 5A, numeral 50 is a housing having a substantially cylindrical shape, 59 is an exhaust gas pipe penetrating the housing 50 along its central axis, and 57a, 57b are $NO_x$ absorbents disposed in the space between the outer surface of the exhaust gas pipe 59 and the inner surface of the housing 50. The $NO_x$ absorbents 57a and 57b are disposed near the center portion of the housing, and spaces 51 and 52 are provided at both ends of the housing 50.

Figure 5B:
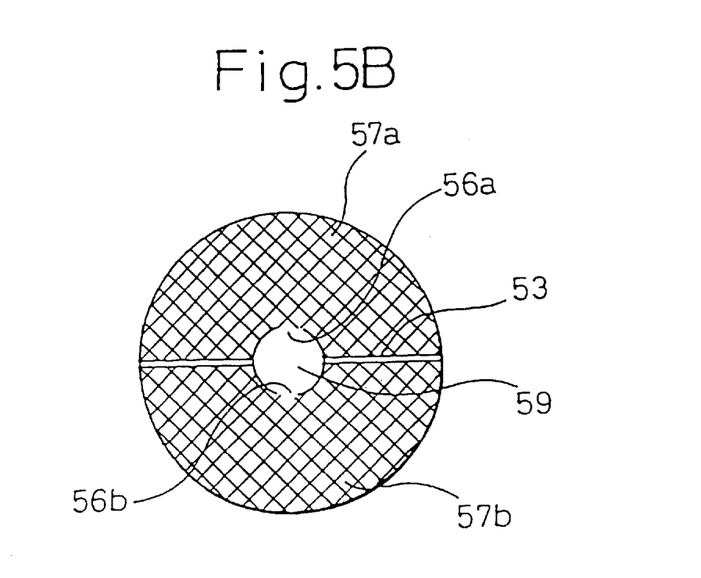

FIG. 5B shows a cross sectional view taken along the line B—B in FIG. 5A. AS Seen from FIGS. 5A and 5B, a partitioning plate 53 is provided between the inner surface of the housing 50 and the outer surface of the exhaust gas pipe 59 in order to separate the $NO_x$ absorbents 57a and 57b. Further, the partitioning plate 53 divides the space 51 at the end of the housing 50 into two separate spaces 51a and 51b. On the other hand, since the partitioning plate 53 terminates at the end face of the $NO_x$ absorbents 57a and 57b at the other end of the housing 50, the space 52 is not divided by the partitioning plate 53.

In the portion of the exhaust gas pipe 59 located in the space 51, ports 55a, 56a and 55b, 56b are provided. The ports 55a and 56a open to the space 51a of the housing 50, while the ports 55b and 56b open to the space 51b of the housing 50, respectively. Further, a switching valve 58 is provided in the exhaust gas pipe 59 at the portion between the ports 56a, 56b and the ports 55a, 55b. The switching valve 58 is driven by an appropriate actuator via a driving shaft 58a so that it takes either a first position as indicated by solid line in FIG. 5A or a second position as indicated by dotted line in FIG. 5A.

When the switching valve 58 takes the first position, the port 55a is opened and the port 56a is closed on the space 51a side of the exhaust gas pipe 59, and the port 55b is closed and the port 56b is opened on the space 51b side of the exhaust gas pipe 59. On the other hand, when the switching valve 58 takes the second position, the port 55a is closed and the port 56a is opened on the space 51a side of the exhaust gas pipe 59, and the port 55b is opened and the port 56b is closed on the space 51b side. Numeral 59b in FIG. 5A shows another partitioning plate which blocks the exhaust gas pipe 59 at the position of the switching valve 58. Numeral 54 in FIG. 5A is a nozzle which injects the reducing agent or the secondary air into the space 52 of the housing 50.

In this embodiment, the exhaust gas from the engine flows into the housing 50 from the direction indicated by an arrow A in FIG. 5A. When the switching valve 58 is set at the first position (shown by the solid line in FIG. 5A), the exhaust gas in the exhaust gas pipe 59 flowing into the space 51a through the port 55a. Since the port 56a is closed by the switching valve 58, the exhaust gas flowing into the space 51a passes through the $NO_x$ absorbent 57a and flowing into the space 52 at the other end of the housing 50. This exhaust gas, then, flows into the $NO_x$ absorbent 57b from the space 52 and flows into the space 51b of the housing 50. From the space 51b, the exhaust gas flows into the portion of the exhaust gas pipe downstream of the switching valve 58 through the port 56b and flows down the exhaust gas pipe 59.

On the contrary, when the switching valve 58 is switched to the second position (indicated by the dotted line in FIG. 5A), the exhaust gas from the engine flows through the port 55b, the $NO_x$ absorbent 57b, the space 52, the $NO_x$ absorbent 57a, the port 56a and exhaust gas pipe 59 in this order. Thus, the direction of the exhaust gas flow can be reversed by switching the switching valve 58 between the first and the second position. Therefore, also in this embodiment, the releasing and reducing operation of $NO_x$ and the absorbing operation of $NO_x$ can be performed alternately in the $NO_x$ absorbents 57a and 57b without stopping the absorption of $NO_x$ in the exhaust gas. According to the embodiment in FIGS. 5A and 5B, since two $NO_x$ absorbents and branch exhaust passages can be contained in a single housing, the construction of the device can be more compact and simple than the devices in FIGS. 1 and 4.

Though the exhaust gas in the exhaust gas pipe 59 flows in the direction shown by the arrow A in FIG. 5A in the above embodiment, the direction of the exhaust gas flow in the exhaust gas pipe 59 may be revered, i.e., the exhaust gas may flow into the spaces 51a and 51b through the ports 56a and 56b, respectively, and flow into the exhaust gas pipe from the spaces 51a and 51b through the ports 55a and 55b, respectively.

Although in the above explanation, the invention has been described with reference to specific embodiments chosen for the purpose of illustration, it should be understood that numerous modifications could be applied by those skilled in the art without departing from the basic concept and scope of the present invention. Especially, other arrangements of the $NO_x$ absorbents and the exhaust gas passages can be applied for the present invention as long as it enables to switch the direction of the exhaust gas flow between two $NO_x$ absorbents.

Figure 6:
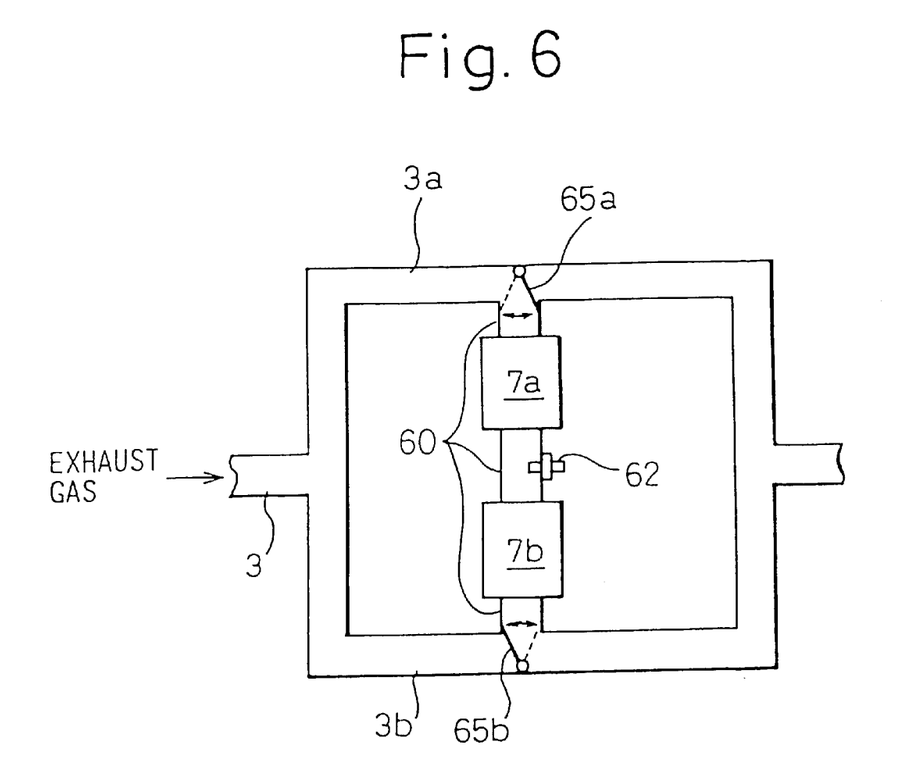
FIG. 6 is a drawing illustrating another embodiment of the exhaust gas purification device according to the present invention.

For example, FIG. 6 shows another arrangement of the $NO_x$ absorbents and the exhaust gas passages. In FIG. 6, the $NO_x$ absorbents 7a and 7b are disposed, in series, in an exhaust connecting passage 60 connecting the branch exhaust passages 3a and 3b. In this embodiment, two switching valves 65a and 65b are disposed at the points where the exhaust connecting passage 60 merges the branch exhaust passages 3a and 3b. The switching valves 65a and 65b are operated synchronously to switch the direction of the exhaust gas flow in the exhaust connecting passage 60.

Namely, when the switching valves 65a and 65b are set at the position shown by solid lines in FIG. 6, the exhaust gas flows into the exhaust connecting passage 60 from the branch exhaust passage 3a and passes the $NO_x$ absorbents 7a and 7b in this order, and flows out to the branch exhaust passage 3b downstream of the switching valve 65b. On the other hand, when the switching valves 65a and 65b are set at the position indicated by dotted lines in FIG. 6, the exhaust gas flows through the branch exhaust passage 3a, the NO$_x$ absorbents 7b and 7a on the exhaust connecting passage 60 in this order and flows into the branch exhaust passage 3a downstream of the switching valve 65a. Therefore, by injecting the reducing agent or the secondary air into the exhaust connecting passage 60 using a nozzle 62 disposed on the passage 60 at the portion between the NO$_x$ absorbents 7a and 7b, a similar operation to that explained in FIGS. 1 and 4 is obtained.

The embodiment in FIG. 6 is advantageous since it requires only two valves 65a and 65b while three valves 5, 8a and 8b are required in the embodiments in FIGS. 1 and 4.

What is claimed is:

1. An exhaust gas purification device for an internal combustion engine which has an exhaust passage, the engine being operated at an air-fuel ratio higher than a stoichiometric air-fuel ratio, the device comprising:

a first NOx absorbent bed and second NOx absorbent bed disposed in an exhaust passage of an engine and connected to each other in series by an exhaust connecting passage, each of the NOx absorbent beds absorbing NOx components in an exhaust gas when an air-fuel ratio of the exhaust gas flowing into the NOx absorbent beds is lean, and releasing absorbed NOx components when an oxygen concentration in the exhaust gas becomes lower than a predetermined amount;

a reducing agent supply means for supplying a reducing agent into the exhaust gas in the exhaust connecting passage between the first and the second NOx absorbent beds;

a switching means for switching the direction of the exhaust gas flow between a first direction in which the exhaust gas flows through the first NOx absorbent bed to the exhaust connecting passage and into the second NOx absorbent bed in this order, and a second direction in which the exhaust gas flows through the second NOx absorbent bed to the exhaust connecting passage and into the first NOx absorbent bed in this order; and a control means for controlling the switching means so that the direction of the exhaust gas flow is switched between the first and second direction.

2. An exhaust gas purification device for an internal combustion engine having an exhaust passage, the engine being operated at an air-fuel ratio equal to or lower than a stoichiometric air-fuel ratio, the device comprising:

a first NOx absorbent and a second NOx absorbent disposed in an exhaust passage of an engine and being connected with each other in series by an exhaust connecting passage, each of the NOx absorbents absorbing NOx components in an exhaust gas when an air-fuel ratio of the exhaust gas flowing into the NOx absorbents is lean, and releasing the absorbed NOx components when an oxygen concentration in the exhaust gas becomes lower than a predetermined amount;

a secondary air supply means for supplying a secondary air into the exhaust gas in the exhaust connecting passage between the first and the second NOx absorbents;

a switching means for switching a direction of the exhaust gas flow between a first direction in which the exhaust gas flows through the first NOx absorbent to the exhaust connecting passage and into the second NOx absorbent in this order, and a second direction in which the exhaust gas flows through the second NOx absorbent to the exhaust connecting passage and into the first NOx absorbent in this order; and a control means for controlling the switching means so that the direction of the exhaust gas flow is switched between the first and the second direction.

* * * * *

UNITED STATES PATENT AND TRADEMARK OFFICE
CERTIFICATE OF CORRECTION

PATENT NO.   : 6,409,973 B1
DATED         : June 25, 2002
INVENTOR(S)  : Yukio Kinugasa et al.

It is certified that error appears in the above-identified patent and that said Letters Patent is hereby corrected as shown below:

Title page,
Item [57], ABSTRACT,
Line 17, change "Noabsorbent" to -- $NO_x$ absorbent --.

Column 2,
Line 5, after "device" delete ",".
Line 66, change "comprises (a)," to -- comprises, (a) --.

Column 3,
Line 6, after "becomes" insert -- lower --.

Column 4,
Line 20, change "ratio some paint" to -- ratio at some point --.
Line 27, change "of to the exhaust" to -- of the exhaust --.

Column 7,
Line 46, after "components" delete ",".

Column 10,
Line 10, after "catalyst 41" insert -- , --.

Signed and Sealed this

First Day of July, 2003

JAMES E. ROGAN
*Director of the United States Patent and Trademark Office*